United States Patent [19]

Van Rijsewijk et al.

[11] 3,793,720

[45] Feb. 26, 1974

[54] METHOD OF AND DEVICE FOR MOUNTING ELECTRIC COMPONENTS ON A MOUNTING PANEL

[75] Inventors: Henri Carel Haverkorn Van Rijsewijk; Ludovicus Megens; Gerard Hendrik Oskam, all of Emmasingel, Eindhoven, Netherlands

[73] Assignee: U.S. Philips Corporation, New York, N.Y.

[22] Filed: Mar. 29, 1972

[21] Appl. No.: 239,209

[30] Foreign Application Priority Data

Apr. 9, 1971 Netherlands ...................... 7104836

[52] U.S. Cl. ................ 29/626, 29/203 B, 29/203 J, 317/101 CC, 317/101 CM, 339/17 B, 339/17 C

[51] Int. Cl. ............................................ H05k 3/30

[58] Field of Search......29/625, 626, 627, 200 T, 29/203 T, 203 B, 203 MW, 203 S; 339/17 R, 17 A, 17 C, 17 CF, 17 L, 339/17 LC, 17 LM, 17 N, 17 B; 317/101 CC, 101 CM

[56] References Cited

UNITED STATES PATENTS

| | | | |
|---|---|---|---|
| 2,871,549 | 2/1959 | Arnold | 29/626 |
| 3,058,440 | 10/1962 | Berry | 29/203 J |
| 3,122,679 | 2/1964 | Kislan et al. | 317/101 CC X |
| 3,184,536 | 5/1965 | Vincent | 339/17 C |
| 3,388,464 | 6/1968 | Pretty | 29/203 B X |
| 3,451,131 | 6/1969 | Gruenstein | 29/627 X |
| 3,512,116 | 5/1970 | Miwa et al. | 29/626 X |
| 3,512,255 | 5/1970 | Hayden et al. | 29/627 X |
| 3,516,155 | 6/1970 | Smith | 317/101 CC X |

*Primary Examiner*—Charles W. Lanham
*Assistant Examiner*—Joseph A. Walkowski
*Attorney, Agent, or Firm*—Frank R. Trifari

[57] ABSTRACT

A method of and device for mounting electric components on a mounting panel in which the components are provided in recesses of a dual jig and their connection wires are forced into the apertures of a mounting panel. During mounting, the connection wires are held at pitch and are accurately positioned relative to the recesses. Each component is provided with a sliding block surrounding the ends of the connection wires and the circumference of which corresponds to the circumference of a recess in the jig. By moving the two parts of the jig against each other, the sliding block is moved relative to the connection wires so that the ends thereof are freed and are forced into the apertures of the mounting panel.

5 Claims, 12 Drawing Figures

METHOD OF AND DEVICE FOR MOUNTING ELECTRIC COMPONENTS ON A MOUNTING PANEL

The invention relates to a method of mounting electric components on a mounting panel. The components have connection wires extending parallel in the same direction, and are placed in recesses of a jig in a pattern corresponding to the required place on the mounting panel. The connection wires extend in the direction of the open side of the recesses, their ends being located in the same plane. The mounting panel and the components are then moved towards each other so that the connection wires are inserted into the apertures of the mounting panel. The connection wires are finally soldered on the mounting panel.

In such a known method, which is suitable for prismatic components only, the connection wires are positioned relative to the mounting panel by guidance of the prismatic body in the associated recess. This known method suffers from the drawback that the connection wires can be damaged and bent during mounting as a result of which they do not become situated opposite to the corresponding aperture in the mounting panel. During the relative movement of the component and the mounting panel, the bent connection wires touch the surface of the mounting panel as a result of which they are completely deformed. A mounting panel with such a component is defective and has to be repaired by replacing the relevant component which is time-consuming and disturbs the production process, or the mounting panel has to be removed from the production process.

Mounting non-prismatic components, i.e., having connection wires extending along the body of the components, is practically impossible by means of this method.

It is the object of the invention to provide a method which does not have the said drawbacks and which enables the mounting of both prismatic and non-prismatic components on a mounting panel in a disturbance-free manner, the reject percentage being reduced.

According to the invention, this object is mainly achieved in tht the connection wires of each component are held at a pitch distance, and both the connection wires and the mounting panel are positioned relative to the jig. This ensures that the connection wires assume an accurate position which will not radially vary relative to the apertures in the mounting panel.

As a result of the position of both the connection wires and the mounting panel relative to the jig, the positioning of the connection wires is independent of the shape of the body of the components. This method is therefore particularly suitable for the disturbance-free mounting of non-prismatic components.

It is to be noted that components having a reference member are known. However, the known reference member serves only to guide the components during the automatic transport thereof or to indicate the polarty of the connection wires. Positioning the connection wires is not obtained by the reference member.

The reference member may form part of the jig and thus serve to position the connection wires of successive components. According to a preferred embodiment of the method according to the invention, however, before placing the components in the recesses, a reference member is provided on each component in such manner that the ends of the connection wires are enclosed by the reference member. The reference member is displaced from the ends of the connection wires during movement of the components and panel so that the ends are free to be forced into the associated apertures of the mounting panel.

As a result, the connection wires are protected by the reference member and maintained at pitch until the instant at which the mounting panel and the components are moved relative to each other; any undesirable bending or damage of the connection wires is absolutely prevented by the reference member.

A preferred embodiment of a component having a reference member which is particularly suitable for carrying out the method according to the invention is characterized in that the reference member has the form of a sliding block secured to the ends of the connection wires with a sliding fit. The block is slidable relative to the connection wires. Its outer circumference corresponds, within narrow tolerances, with the inner circumference of the associated recess in the jig. The sliding block has a number of holes corresponding to the number and the pitch of the connection wires.

When using such a component with a sliding block as a reference member, the block is moved along the wires toward the body of the component during the relative movement of the component and mounting panel. The sliding block is permanently connected to the components and in the displaced position contacts the mounting panel. In addition to the required functions, namely the maintaining at pitch of the connection wires, the protection of their ends, and the positioning relative to the mounting panel, the sliding block fulfils a further function, namely that of insulation element and spacing member of the components relative to each other. The sliding block may also serve as a spacing member in the direction of height and as a protection of temperature-sensitive components against overheating during soldering. The sliding block is manufactured from an insulating material, for example a synthetic material. In the case of automatic supply of the components, the sliding block may in addition serve as a guiding element.

In order to ensure a good soldered joint of the components on the mounting panel, the gases formed during soldering should be able to escape. In a preferred embodiment of the component with reference member this object is achieved by providing recesses on a surface of the block remote the component body surrounding the holes and communicating with the circumference of the sliding block. During soldering, these recesses constitute outlet ducts for the exhaust of the gases.

In order to facilitate the insertion of the connection wires into the apertures of the mounting panel, the apertures may be partially conical while the ends of the connection wires may be punctiform.

In order to prevent the components during the soldering process from working loose from the mounting panel, the jig may be used as a pressure element. However, this function of the jig is superfluous in that according to the invention the components are held on the mounting panel by a light drive fit of the connection wires in the apertures of the mounting panel.

A jig for carrying out the method according to the invention may be provided with dies for moving the components relative to the mounting panel. Preferably, however, a simpler and cheaper jig is used having a base plate which is provided with recesses, Such a jig is characterized by a sliding plate which is movable relative to the base plate and having cavities the pattern of which corresponds to the pattern of the recesses in the base plate, having a supporting surface for a mounting panel. The jig may also have elements on the two plates for the guiding thereof during their relative movement and reference elements on the sliding plate for positioning the mounting panel relative to the jig.

A preferred embodiment of the jig according to the invention which is particularly suitable for use as a pressure jig during soldering is characterized in that grooves are provided in the supporting surface of the sliding plate and along the circumference of the cavities. During soldering, the mounting panel is forced against the supporting surface as a result of which the sliding blocks are enclosed in the grooves and held in the insertion device with the components.

In other that the invention may be readily carried into effect, it will now be described in greater detail, by way of example, with reference to the accompanying drawings, in which.

Figure 1:
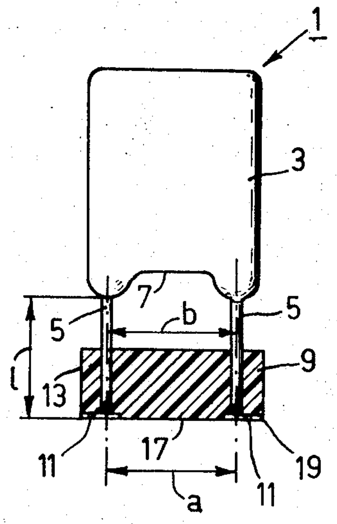
FIGS. 1, 2 and 3 are a front elevation, a side elevation and a plan view, respectively, partly in cross-section of an embodiment of a component having a reference member according to the invention.
Figure 2:
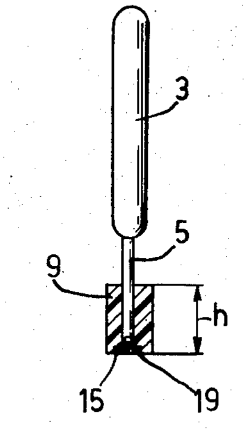
Figure 3:
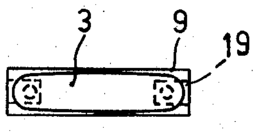

The component 1 shown in FIGS. 1, 2 and 3, in this embodiment is a ceramic plate capacitor, and consists of a body 3 provided with two connection wires 5. The wires extend on the same side 7 of the body, are parallel to each other and have the same length *l*. A sliding block 9 serving as a reference member is provided on the free ends of the connection wires 5 with a sliding fit. For this purpose, the slding block 9 has two holes 11 the distance *a* of which between the center lines corresponds to the required pitch *b* of the connection wire 5. The circumference 13 of the sliding block 9 corresponds within narrow tolerances with the inner circumference of the associated recess in the jig to be described. The connection wires 5 have a punctiform end 15. The circumference 13 of the sliding block 9 is slightly larger than the projected surface of the body 3 of the components, in the order of magnitude of a few tenths of a millimetre.

Figure 4:
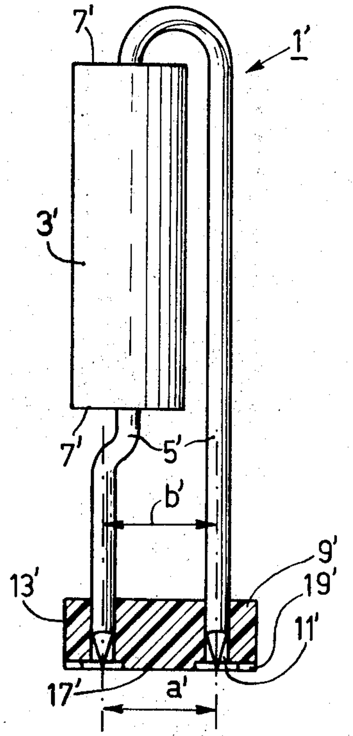
FIGS. 4, 5 and 6 are a front elevation, a side elevation and a plan view, respectively, partly in cross-section of another embodiment of a component having a reference member.
Figure 5:
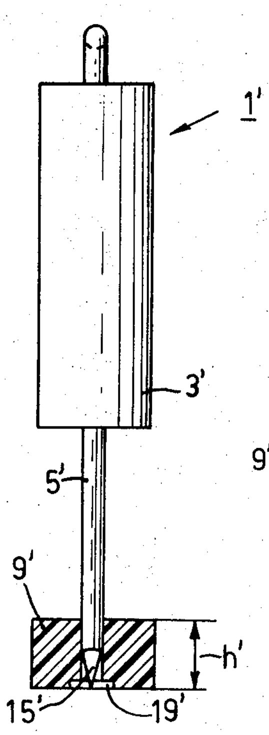
Figure 6:
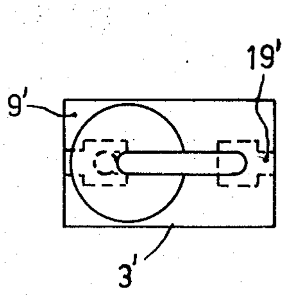

FIGS. 4, 5 and 6 show a component 1' of another embodiment, namely a carbon resistor. This component comprises two connection wires 5' extending on oppositely located sides 7' of the body 3' of the component. Prior to mounting the component, one of the connection wires 5' is to be bent so that both connections extend in the same direction. The connection wires 5' also have a punctiform end 15'. The dimensions of the sliding blocks 9' serving as a reference member are adapted in a corresponding manner to the dimensions of the component 1', taking into account the connection wire extending along the body 3' of the component.

On their surfaces 17, 17' remote from the bodies 3, 3' of the component, the sliding blocks 9, 9' have recesses 19, 19' which have a depth in the order of magnitude of a few tenths of a millimetre; the recesses 19, 19' surround the holes 11, 11' and partly extend up to the circumference of the sliding block to thus produce a communication of the holes 11, 11' with the circumference 13, 13' of the sliding blocks 9, 9'.

Figure 7:
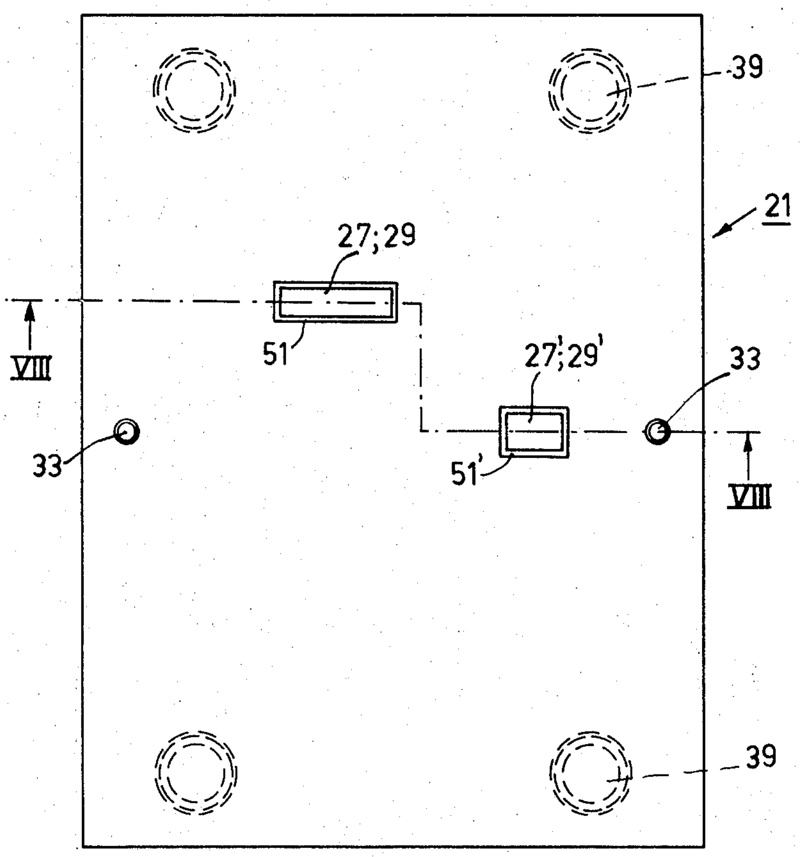
FIG. 7 is a plan view of a device for carrying out the method according to the invention.
Figure 8:
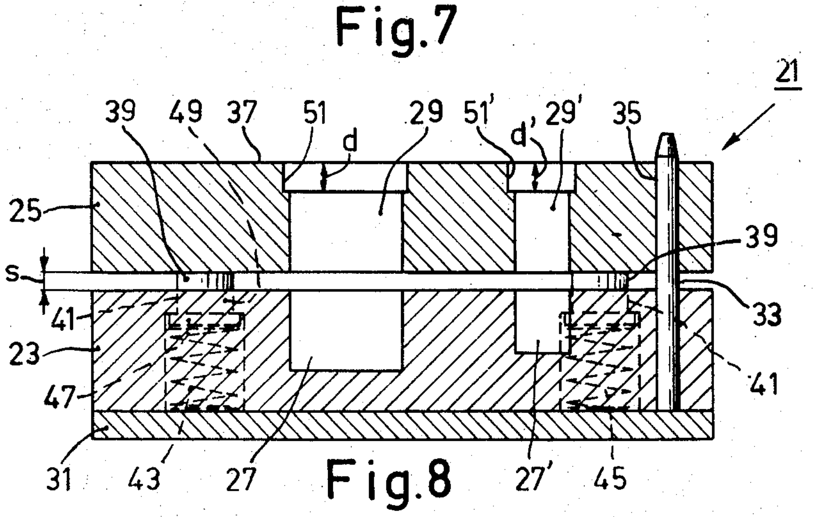
FIG. 8 is a sectional view of the device taken on the line VIII—VIII of FIG. 7.

For inserting the components into a mounting panel, the dual jig 21 shown in FIGS. 7 and 8 is preferably used which comprises a base plate 23 and a sliding plate 25 which are relatively movable. The base plate 23 comprises recesses 27, 27' and the sliding plate comprises cavities 29, 29', the recesses and cavities being provided according to the same pattern. The recesses 27 are closed on the lower side of the base plate 23 by a bottom plate 31. For simplicity, only two recesses and two cavities are shown. The two plates 23 and 25 are guided with respect to each other by pins 33 on the base plate 23 which cooperate with guides 35 in the sliding plate 25. The side of the sliding plate 25 remote from the base plate 23 constitutes a supporting surface 37 for a mounting panel. The sliding plate 25 bears on dies 39 which are slidable in guides 41 in the base plate 23. The dies 39 bear on springs 43 present in chambers 45 of the base plate 23. In the rest position of the jig 21, the dies 39 engage with a flange 47 the collar 49 on the base plate 23, so that the base plate 23 and the sliding plate 25 are at a given distance *s*. The sliding plate 25 can be pressed against the base plate 23 manually or mechanically against the action of the springs 43.

Grooves 51, 51' are provided in the supporting surface 37 of the sliding plate 25 along the circumference of the cavities 29, 29'; the circumference and the depth *d, d'* of said grooves is, within narrow tolerances, equal to the circumference and the height *h, h'* of the sliding blocks 9, 9'. The cross-section of the remaining part of the cavities 29, 29' and of the recesses 27, 27', as well as the depth hereof is adapted to the shape and the dimensions of the components 1, 1'. The base plate 23 and the sliding plate 25 are manufactured from a readily workable material, for example, a light metal alloy or a synthetic resin.

Figure 9:
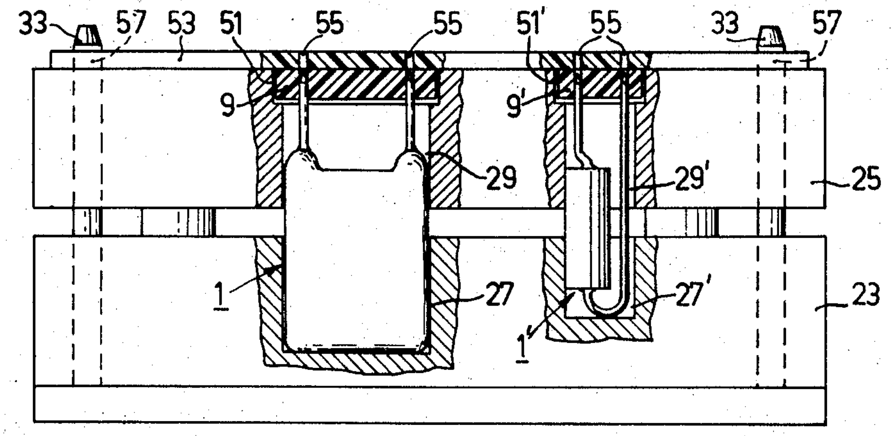
FIG. 9 is a sectional view of the device with components arranged therein on a slightly larger scale.
Figure 10:
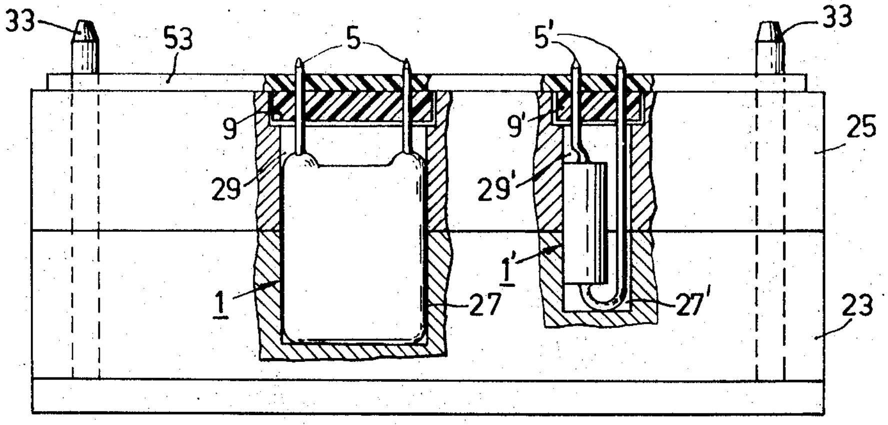
FIG. 10 shows the device after mounting the components.

FIGS. 9 and 10 show the jig 21 with the components 1, 1' placed therein prior to and after, respectively, introducing the components in a mounting panel 53. The components 1, 1' are placed in the corresponding recesses 27, 27' through the cavities 29, 29', and bear on the bottom of the recesses 27, 27' with their ends remote from the connection wires 5, 5'. The depth of the recesses 27, 27' and of the grooves 51, 51' has been previously determined so that the end face of the sliding blocks 9, 9' becomes situated in the supporting surface 37 of the sliding plate 25, as is shown in FIG. 9. In this position, the sliding blocks, 9, 9' ensure the positioning of the connection wires 5, 5' relative to the jig 21. The mounting panel 53 is placed on the supporting surface 37 of the sliding plate 25, said panel comprising apertures 55 in which the connection wires 5, 5' of the components 1, 1' are to be inserted. The mounting panel 53 furthermore comprises reference apertures 57 which in cooperation with the pins 33 on the base plate 23 ensure the position of the mounting oanel 53 relative to the jig 21, In this manner, the connection wires, 5, 5' of the various components 1, 1' are positioned accurately relative to the mounting panel 53 in a pattern which correspond to the pattern of the apertures 55 in the mounting panel 53.

For mounting the components 1, 1' on the mounting panel 53, the sliding plate 25 together with the mounting panel is moved in the direction toward the base plate 23 and pressed against said plate. Movement of the sliding plate 25 relative to the components 1, 1', and movement of the sliding blocks 9, 9', as well as of the mounting panel 53 relative to the connection wires 5, 5' takes place. As a result, the wires are forced into the apertures 55 of the mounting panel 53.

During this whole operation, the connection wires are positioned within accurate tolerances by the sliding blocks. These tolerances can be extended by giving the apertures 55 a partly conical shape having a cross-section which increases in the direction of the sliding plate 25. Thus, insertion of the wires is facilitated in cooperation with the already described punctiform ends 15, 15'. The shape of the apertures 55 is clearly visible in FIGS. 11 and 12.

The cross-sections of the connection wires 5, 5' and of the apertures 55 in the mounting panel 53 may be proportioned so that the connection wires, after insertion, are held in the apertures by a light drive fit. The mounting panel can be removed from the jig together with the components without the risk of working loose of the components, after which soldering may be carried out on the connection wires, for example, by dip soldering, drag soldering or flow soldering. It is necessary, however, that the cross-section of the connection wires of the various components and the diameter of the associated apertures in the mounting panel are matched to each other. In this case the grooves 51, 51' in the sliding plate 25 are not necessary.

The clamping connection of the connection wires in the apertures of the mounting panel is not necessary with the embodiment of the jig shown in the drawing in which the grooves 51, 51' are provided in the supporting surface 37 of the sliding plate 25, said grooves enabling the use of the sliding plate 25 as a pressure jig during dip soldering. In the position of the components 1, 1' shown in FIG. 10, the sliding blocks 9, 9' are enclosed in the grooves 51, 51' which constitute a seat for the sliding blocks. The sliding plate 25 together with the mounting panel 53 and the components is removed from the base plate 23. By providing clamps, the sliding plate and the mounting panel are held together after which soldering can be carried out. Duting this operation, the components are held on the mounting panel by the sliding blocks 9, 9' enclosed in the grooves 51, 51'. During soldering, the mounting of components can be continued by successively placing further sliding plates which are identical to the first sliding plate on the same base plate.

A pressure cushion, for example of a synthetic material, may also be used for soldering and may be provided with recesses in accordance with the recesses 27, 27' in the base plate 23. During soldering, mounting panel 53, sliding plate 25 and pressure cushion are held together by clamps and the components 1, 1' are enclosed in the cavity 29, 29' of the sliding plate 25 and in the recesses of the pressure cushion. In this case, both the grooves 51, 51' in the sliding plate 25 and the light drive fit of the connection wires 5, 5' in the aperture 55 of the mounting panel 53 are superfluous. As a result of the omission of the grooves 51, 51', the projected surface of the sliding blocks 9, 9' can be kept smaller.

Figures 11, 12:
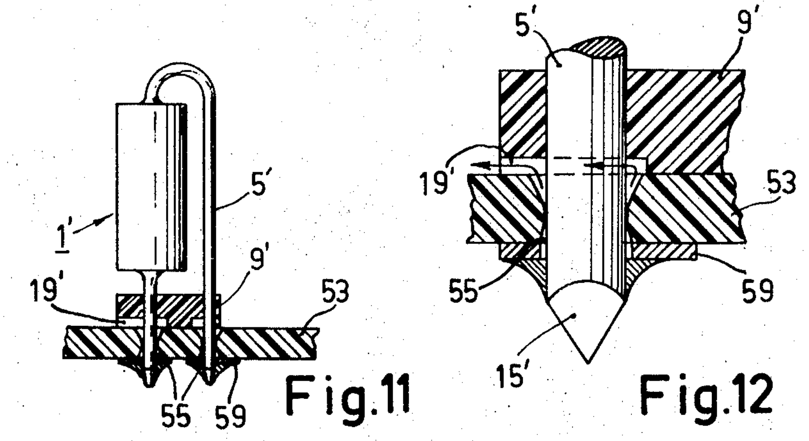
FIG. 11 shows a component with sliding block mounted on a mounting panel after soldering.
FIG. 12 is a soldered joint on an enlarged scale.

FIG. 11 shows the mounting panel 53 with the component 1 and with the sliding block 9 after soldering. FIG. 12 shows on an enlarged scale a soldered joint in which reference numeral 59 denotes a copper track on the mounting panel. Thegases formed during soldering can escape through the recesses 19' in the sliding block 9'.

What is claimed is:

1. A method of mounting electric components having a body and connection wires extending therefrom in the same direction and parallel to each other on a mounting panel having a aplurality of apertures for receiving said connection wires comprising the steps of placing a reference member on said component by passing said wires through receiving holes therein so that said reference member is slidably displaceable along said wires so that the ends of said wires are enclosed by said reference members and may be exposed by displacement of said reference member toward the body of said component, inserting said component carrying said reference member into a first recess of a jig body first so that said connection wires extend in a direction toward the open side of said first recess the ends of which are located in the same plane, said reference member being received in a second recess aligned with said first recess, maintaining said connection wires in a stationary position at pitch distance apart while said component is in said jig, arranging said mounting panel on said jig so that said apertures are aligned with said connection wires, being held in accurate immovable position with respect to said apertures by said reference member, moving said mounting panel and said jig toward each other so that said reference member is engaged by said mounting panel and displaced toward the body of said component so that the ends of said connection wires are exposed and inserted into said apertures of said mounting panel and soldering said connection wires onto said mounting panel.

2. An apparatus for mounting electric components having a body and connection wires extending therefrom in the same direction and parallel to each other on a mounting panel having a plurality of apertures for receiving said connection wires comprising a jig for receiving said components and holding said components in stationary position, said jig comprising a base plate having first recesses therein for receiving the body of said components, a sliding plate movably mounted on said base plate for displacement toward and away therefrom, a plurality of cavities in said sliding plate corresponding to the number and pattern of said first recesses in said base plate and aligned therewith for receiving a portion of the body of said components, a supporting surface on the side of said sliding plate remote from said base plate for receiving and supporting thereon said mounting panel, the connection wires of said components extending through said cavities of said sliding plate, guide means on said base plate and said sliding late for guiding displacement of one with respect to the other so that said first recesses in said base plate are aligned with said cavities in said sliding plate, said guide means arranged on the surface of said sliding plate for guiding placement of said mounting panel so that said apertures will be aligned with the connection wires of said components, and a sliding block forming a reference member slidably fit on the ends of said connection wires for maintaining said wires in accurate aligned position for displacement toward the body of said component so that when said sliding plate is moved toward said base plate said reference member will be slid along said connection wires toward said body of said component to expose the free ends of said connection wires for insertion into the apertures of said mounting panel aligned therewith.

3. The apparatus according to claim 2 further comprising second recesses formed on the surfaces of said sliding plate remote from said base plate aligned with said cavities for receiving said sliding block, the circumference of said sliding block corresponding within narrow tolerances with the inner circumference of said second recesses.

4. The apparatus according to claim 2 wherein the apertures on said mounting panel for receiving said connection wires are partially conical, and wherein the ends of said connection wires and punctiform so that said components are held on the mounting panel by a light drive fit of the connection wires in said apertures.

5. The apparatus according to claim 2 further comprising grooves provided on the supporting surface of the sliding plate remote from said base plate and along the circumference of said cavities.

* * * * *